United States Patent
Fleischer et al.

(10) Patent No.: US 9,251,048 B2
(45) Date of Patent: Feb. 2, 2016

(54) MEMORY PAGE MANAGEMENT

(71) Applicant: International Business Machines Corporation, Armonk, NY (US)

(72) Inventors: Bruce M. Fleischer, Bedford Hills, NY (US); Hans M. Jacobson, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/655,505

(22) Filed: Oct. 19, 2012

(65) Prior Publication Data

US 2014/0115294 A1    Apr. 24, 2014

(51) Int. Cl.
  *G06F 12/02*    (2006.01)
  *G06F 12/08*    (2006.01)
(52) U.S. Cl.
  CPC ............ *G06F 12/0215* (2013.01); *G06F 12/08* (2013.01)
(58) Field of Classification Search
  None
  See application file for complete search history.

(56) References Cited

U.S. PATENT DOCUMENTS

| | | | |
|---|---|---|---|
| 6,526,483 B1 * | 2/2003 | Cho et al. ...................... | 711/154 |
| 7,079,439 B2 | 7/2006 | Cowles et al. | |
| 7,133,995 B1 * | 11/2006 | Isaac et al. .................... | 711/204 |
| 7,761,656 B2 * | 7/2010 | Madrid et al. ................ | 711/105 |
| 7,814,362 B2 | 10/2010 | Drexler | |
| 8,154,935 B2 | 4/2012 | Rajan et al. | |
| 2005/0216678 A1 * | 9/2005 | Jeddeloh ....................... | 711/154 |
| 2008/0003107 A1 | 1/2008 | Carvalho | |
| 2008/0031072 A1 | 2/2008 | Rajan et al. | |
| 2010/0241782 A1 * | 9/2010 | Maddali et al. ............... | 711/5 |
| 2011/0264858 A1 * | 10/2011 | Jeddeloh et al. ............. | 711/114 |
| 2012/0059983 A1 * | 3/2012 | Nellans et al. ................ | 711/105 |
| 2014/0040532 A1 * | 2/2014 | Watanabe et al. ............ | 711/103 |

FOREIGN PATENT DOCUMENTS

| | | |
|---|---|---|
| JP | 7230407 A | 8/1995 |
| JP | 10027469 A | 1/1998 |
| JP | 2011192212 A | 9/2011 |

OTHER PUBLICATIONS

Jiang et al., "LIRS: An Efficient Low Inter-reference Recency Set Replacement Policy to Improve Buffer Cache Performance", Sigmetrics Proceeding 2002, pp. 31-42.*

(Continued)

*Primary Examiner* — Aimee Li
*Assistant Examiner* — Tracy Chan
(74) *Attorney, Agent, or Firm* — Cantor Colburn LLP

(57) ABSTRACT

According to one embodiment, a method for operating a memory device includes receiving a first request from a requestor, wherein the first request includes accessing data at a first memory location in a memory bank, opening a first page in the memory bank, wherein opening the first page includes loading a row including the first memory location into a buffer, the row being loaded from a row location in the memory bank and transmitting the data from the first memory location to the requestor. The method also includes determining, by a memory controller, whether to close the first page following execution of the first request based on information relating to a likelihood that a subsequent request will access the first page.

20 Claims, 4 Drawing Sheets

(56) References Cited

OTHER PUBLICATIONS

Cao et al., "Application-Controlled File Caching Policies", Proceeding of the USENIX Summer 1994, Technical Conference, 1994, pp. 171-182.*

Mowry et al., "Automatic Compiler-Inserted I/O Prefetching for Out-of-Core Application", Proceedings of the Second USENIX Symposium on OS Design and Implementation, 1993, pp. 297-306.*

Patterson et al., "Informed Prefetching and caching", Preceding of the 15th Symposium on OS Principles, 1995, pp. 79-95.*

* cited by examiner

MEMORY PAGE MANAGEMENT

BACKGROUND

The present invention relates generally to computer memory, and more particularly to page management for a memory system.

Computer systems often require a considerable amount of high speed memory, such as random access memory (RAM), to hold information, such as data and programs, when a computer is powered and operational. Memory device densities have continued to grow as computer systems have increased performance and complexity.

Communication from a main processor to locations on dense memory devices can require additional power due to longer signal paths resulting from the increased density. Further, in the high density memory devices, data access times and latency associated with data operations are increased while effective bandwidth between the main processor and memory are reduced due to the distance between the processor and memory.

With memory packages, there is often a tradeoff to be made regarding latency, power and keeping an internal memory page open (i.e. loaded from physical memory into a buffer). Allowing a page to remain open can result in lower latency and power if a subsequent request accesses that page, with the additional latency that may occur when a page miss occurs (i.e. the page kept open is not subsequently accessed). The latency and power are lower for an open page policy as compared to a closed page policy which closes the page following each access. The closed page policy keeps the average latency constant, but at the cost of higher power and longer latency for the cases when back-to-back requests are to the same page.

SUMMARY

According to one embodiment, a method for operating a memory device includes receiving a first request from a requestor, wherein the first request includes accessing data at a first memory location in a memory bank, opening a first page in the memory bank, wherein opening the first page includes loading a row including the first memory location into a buffer, the row being loaded from a row location in the memory bank and transmitting the data from the first memory location to the requestor. The method also includes determining, by a memory controller, whether to close the first page following execution of the first request based on information relating to a likelihood that a subsequent request will access the first page.

According to another embodiment, a system for operating a memory device comprising a memory bank and a memory controller is provide, where the system is configured to perform a method comprising receiving a first request from a requestor, wherein the first request includes accessing data at a first memory location in the memory bank and opening a first page in the memory bank, wherein opening the first page comprises loading a row including the first memory location into a buffer, the row being loaded from a row location in the memory bank. The method also includes transmitting the data from the first memory location to the requestor and determining, by the memory controller, whether to close the first page following execution of the first request based on a selected portion of the first request, wherein the selected portion of the first request comprises information relating to a likelihood that a subsequent request will access the first page.

DETAILED DESCRIPTION

Figure 1:
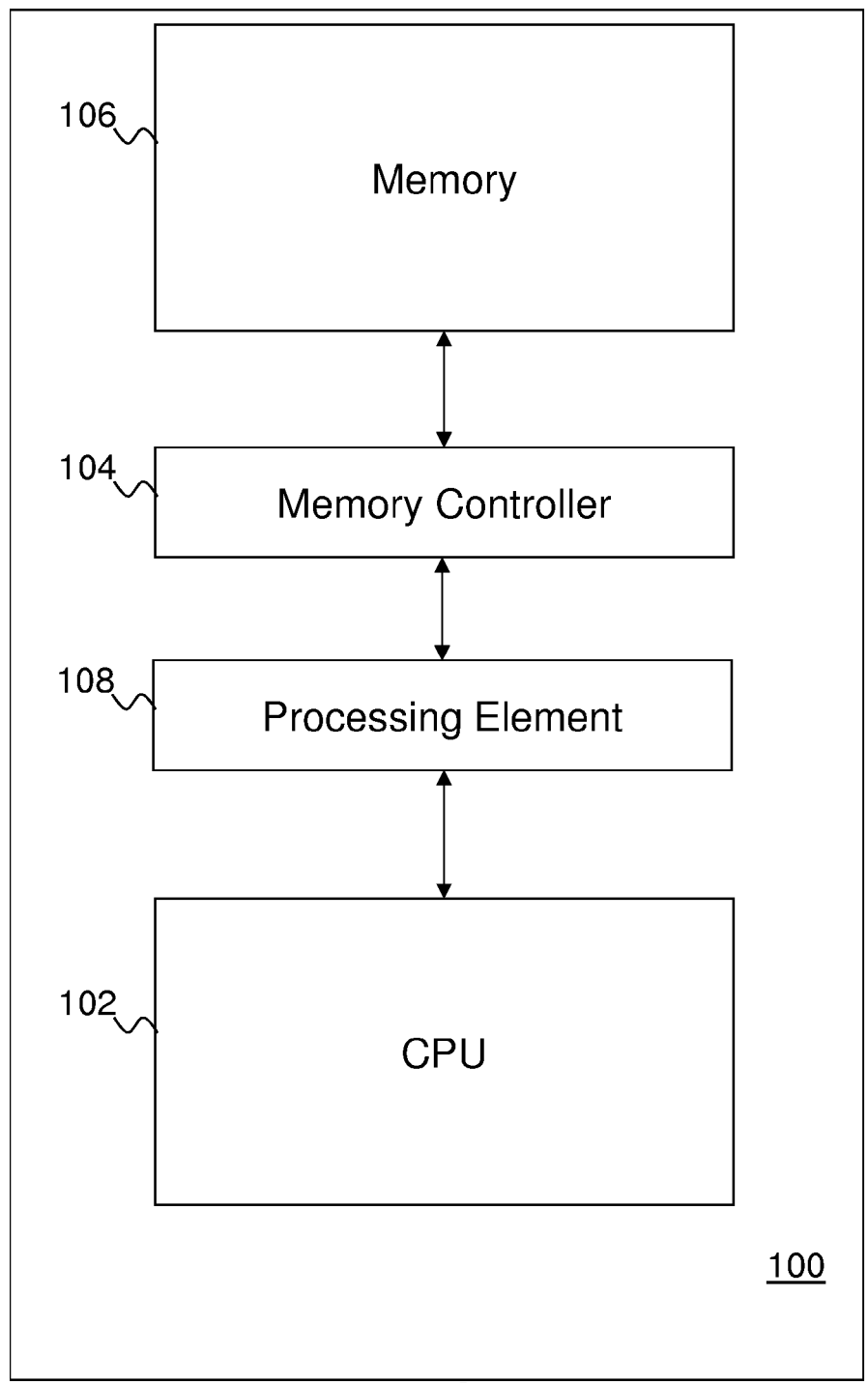
FIG. 1 illustrates a block diagram of a system for active buffered memory in accordance with an embodiment.

An embodiment is directed to operating a memory system including a memory device, such as a buffered memory device. The memory device may be any suitable memory device including one or more memory device (e.g., random access memory "RAM" chips) connected to a hub chip (also referred to as a memory controller chip) configured to control the memory device. In an embodiment, the buffered memory device includes layers of memory that form a three dimensional ("3D") memory device (also referred to as "memory cube") where individual columns of memory chips form stacks or vaults in communication with the hub chip. In one embodiment, a plurality of memory stacks are located on a memory module, where each stack has a respective hub chip. The hub chips may include a processing element configured to communicate with the memory and other processing elements in other hub chips. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller.

An embodiment provides improved memory operation with reduced latency and power consumption using a dynamic memory page management method and system. In an embodiment, the dynamic memory page management determines whether to open or close a page after an operation performed on a page loaded into a buffer, while the system is operating. For example, after a first request has loaded the first page and an operation is performed on the first page, a memory controller reads a selected portion of the first request to determine a state (e.g. open or closed) for the first page. In embodiments, the selected portion of the first request comprises information relating to a likelihood that a subsequent request will access the first page. In an embodiment, a requestor appends a message as the selected portion to the request, thus indicating the likelihood of the subsequent request accessing the currently open page.

In embodiments, the likelihood information regarding a subsequent request accessing the currently open page can be used to send a speculative request to open or close a page. In the example, this use of the likelihood information is not appended to a data-accessing request, but is instead used to generate an open or close page request. In an embodiment, an open page request is received where the only operation in the request is to open the page and does not perform any operation on the data in the page after opening it. In another embodiment, the request is a close page request where the only operation is to close the page. Thus, in an example, the likelihood information is used to provide a speculative request before the next data-accessing request (e.g., load or store requests). Accordingly, the speculative request to open a page or close an already open page is used to improve performance and reduce latency.

In an embodiment with a memory cube structure, each memory bank opens a page of a certain size (e.g. 1024 bytes) and transmits a small portion of the page (e.g. 16 bytes) back to the requestor. If the next request to the bank happens to address a location within the same page, a significant amount of power can be saved if the page is kept open, meaning the full page is still in sense amplifier buffers of the memory bank and has not been written back to the memory. Thus, the page is kept open until the next request and the next request will incur a delay if the next request addresses a location in a different page of the bank. This delay is incurred in closing the page, i.e. writing the contents of the sense amplifier buffers back to memory, and in opening the new page. Alternatively, a closed page policy keeps the average latency constant by closing the page after an operation is complete. This policy may be executed at the cost of higher power usage and longer latency for the cases when back-to-back requests are to the same page.

Embodiments of the dynamic page management enable a memory system performing complex operations to autonomously take advantage of its knowledge of upcoming operations to inform the memory bank, when making a request, about the likelihood of the next request accessing the same page or a different page. The logic in the memory bank can use this information along with standard policy, e.g., a policy governed by reliability and refresh considerations, to either keep the page open or to close it. An exemplary embodiment uses two bits appended to a read or write request provided to the controller. The exemplary two bits may have the following definitions for bit values: 00 indicates a weak desire to keep the page open; 01 indicates a strong desire to keep the page open (to save power); 10 indicates a weak desire to the close the page; and 11 indicates a strong desire to the close the page (to save latency).

In one embodiment, an indication of whether the page should remain open is transmitted from the source or requestor to the destination memory controller. In an example, the accessed bank page remains open due to subsequent requests that are expected to be in the address range of the loaded bank page, thus saving latency and power. In one embodiment, the indication is generated by a processor or processing element by reading the address stride of vector load/store-update instructions. In another example, the indication is generated by performing and employing logic using a speculative load/store lookahead mechanism, such as by looking at consecutive entries in the load/store queue. Other embodiments of providing the indication include using prediction logic based on previous observed behavior, using hints from a compiler or programmer and using stride information from a prefetch mechanism. In the prefetch mechanism the memory location to fetch from next is known by the implemented prefetch algorithm (typically based on assumed sequential access or previously observed stride-N or other access pattern) and it can thus easily be determined whether a prefetch request will fall within an already open page or not providing opportunity for both using speculative open/close page requests and providing hint bits in a data request on whether to keep a page open or close it. In a cache-based processor or processing element, a stride or other prefetch mechanism is used to provide the indication. In one embodiment, the indication is generated by fields in the application instructions, thus allowing the method to "look ahead" longer distances (further into future operations) in the application. The indication in the application instructions may be based on hints from the application programmer, by target address calculation or estimation by the compiler or through profiling runs.

Embodiments of the memory system and method include utilizing an increased amount of knowledge of both the memory system organization (i.e. memory size, page size) and applications to improve memory page management, thus reducing latency and power usage. For example, a system with a memory stack and a processing element in the same device provides additional information about the applications and memory usage to allow the processing element to determine the likelihood that a subsequent memory access will be on the same page as the currently loaded page. Further, the dynamic policy allows for a change between a closed or open state for the page based on the information available to the processing element.

Embodiments include a memory stack with a processing element and memory controller in the hub chip, referred to as an active buffered memory device. The active buffered memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active buffered memory device is configured to load configuration information or instructions from a part of the active buffered memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active buffered memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active buffered memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

FIG. 1 illustrates a block diagram of a system for storing and retrieving data in a memory in accordance with an embodiment. A system 100 depicted in FIG. 1 includes a computer processor 102, a memory 106 having memory devices, as well as a memory controller 104 and processing element 108 for receiving data from the computer processor 102 to be stored in the memory 106. In an embodiment, the memory controller and processing element 108 may be referred to as a hub chip.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, the command from the computer processor 106 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. Further, embodiments may include fewer devices than depicted, such as a memory system with no processing element 108. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

Figure 2:
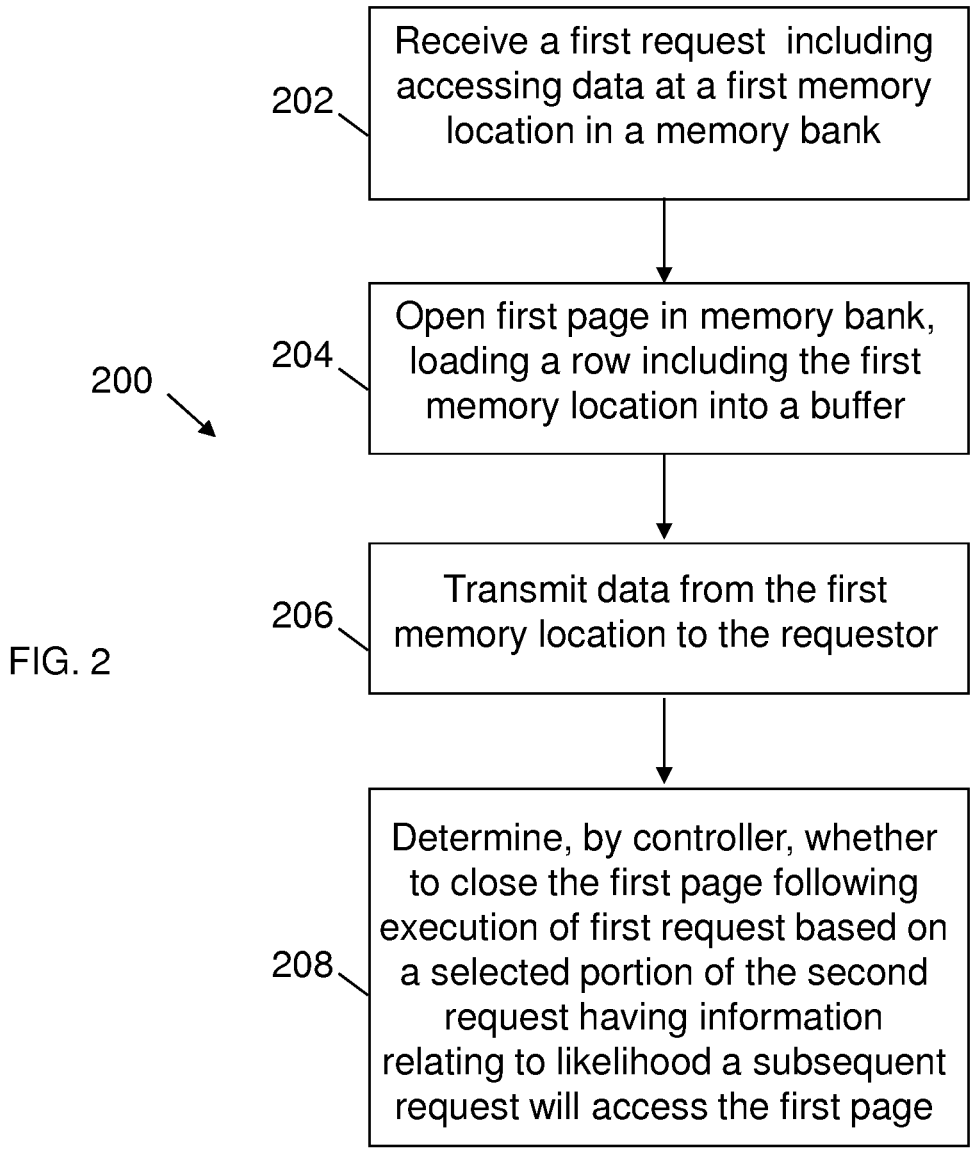
FIG. 2 illustrates a flow diagram of a method for operating a memory system with active buffered memory in accordance with an embodiment.

FIG. 2 is a flow chart 200 of an exemplary method and system for operating a memory system. The blocks may be performed by any suitable memory system, such as a memory system including active buffered memory devices. In block 202, a first request is received from a requestor, where the first request includes accessing data at a first memory location in a memory bank in the memory device. In embodiments, the requestor is a processing element or processor and the request is received by a memory controller. In block 204 a first page in the memory bank is opened, which includes loading a row including the first memory location into a buffer, the row being loaded from a row location in the memory bank. In embodiments, the first memory location is an element in the row. In block 206, data from the first memory location is transmitted from the first memory location to the requestor. In an embodiment, an operation may be performed on the data prior to transmitting the data to the requestor. In another embodiment, the requestor performs an operation on the data after receiving it from the controller. In block 208, a memory controller determines whether to close the first page following execution of the first request, based on a selected portion of the first request, where the selected portion of the first request comprises information relating to a likelihood that a subsequent request will access the first page, thus implementing the dynamic page policy. In an embodiment, prior to sending the request, the requestor appends the information relating to the likelihood of the subsequent request accessing the first page to the request. In embodiments, the memory bank and the memory controller are located in a memory stack. In the step of opening the page, the row, including the first memory location, is loaded into a buffer in the memory bank in the memory device that includes the memory bank. In closing the page, a controller writes a current version of the row to the location from which the page was loaded. In one embodiment, the controller may invalidate the page, where the page is closed but the row is not rewritten back to the memory location based on the appended data.

Figure 3:
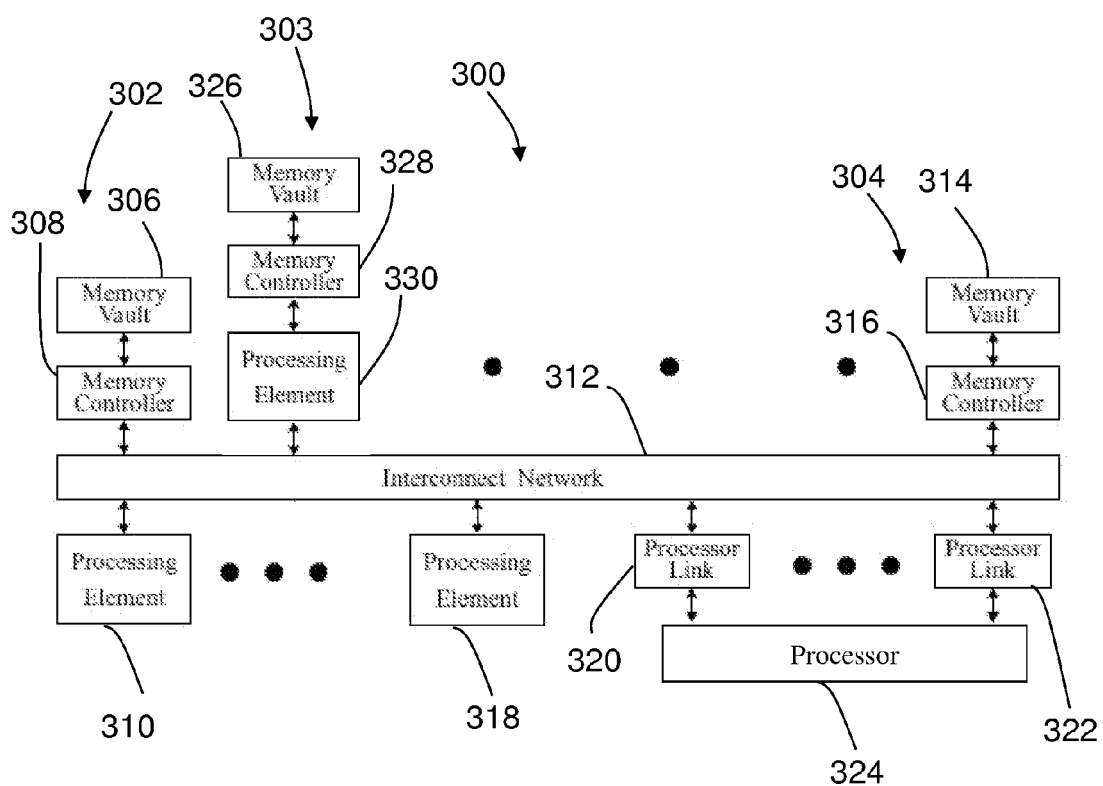
FIG. 3 illustrates a block diagram of a memory system with active buffered memory in accordance with an embodiment.

FIG. 3 is a schematic diagram of an embodiment of a computer system 300 implementing dynamic memory page management. In one embodiment, the computer system 300 includes an active buffered memory device 302, an active buffered memory device 303 and an active buffered memory device 304. The active buffered memory device 302 includes a memory vault 306, a memory controller 308 and a processing element 310. In an embodiment, the processing element 310, memory vault 306 and memory controller 308 are coupled and communicate via an interconnect network 312. Specifically, the processing element 310 communicates to the memory vault 306, memory controller 308 and other memory devices, such as active buffered memory devices 303 and 304, via the interconnect network 312. The interconnect network 312 is also coupled to a main processor 324 by processor links 320 and 322. The interconnect network 312 provides a fast and high bandwidth path for communication between portions of the device, such processing elements, memory controllers and memory, to provide improved performance and reduced latency for the active buffered memory.

The active buffered memory device 303 includes a memory vault 326, a memory controller 328 and a processing element 330. In an embodiment, the processing element 330, memory vault 326 and memory controller 328 are all located on the same side of the interconnect network 312, such as within a single stack. By positioning the processing element 330 in the same stack as memory vault 326, the latency is reduced when accessing locations in the memory vault 326, thus further improving performance. In one embodiment, the active buffered memory 304 includes a memory vault 314 and memory controller 316 coupled to processing elements 310 and processing element 318 via the interconnect network 312. As depicted, the processing element 318 is located on the other side of the interconnect network 312 from the memory controller 316 and memory vault 314. In embodiments, the active buffered memory devices 302, 303 and 304 include multiple layers of stacked addressable memory elements. Further, the stack's memory may be divided into memory vaults 306, 326 and 314, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 318, may be positioned on one side of the interconnect network 312 and may operate as a pool of processing elements that are available for accessing any memory in the memory system coupled to the interconnect network 312. The pooled processing elements are not limited to accessing a particular memory vault and, thus, one or more elements may be utilized upon receiving a command from the main processor 324. Accordingly, processing element 318 may be configured to access each memory vault 306, 326 and 314. In another embodiment, one or more processing elements, such as processing element 330, is located as part of a stack including a memory vault 326 and memory controller 328. In such a configuration, the processing element 330 is configured to access memory vault 326 coupled to the interconnect network 312, including memory vaults 306 and 314. In one embodiment, one or more processing element, such as processing element 310, is positioned on an opposite side of the interconnect network 312 from the memory vault 306 and memory controller 308. In the configuration, the processing element 310 is configured to access any memory coupled to the interconnect network 312, including memory vaults 326 and 314.

Figure 4:
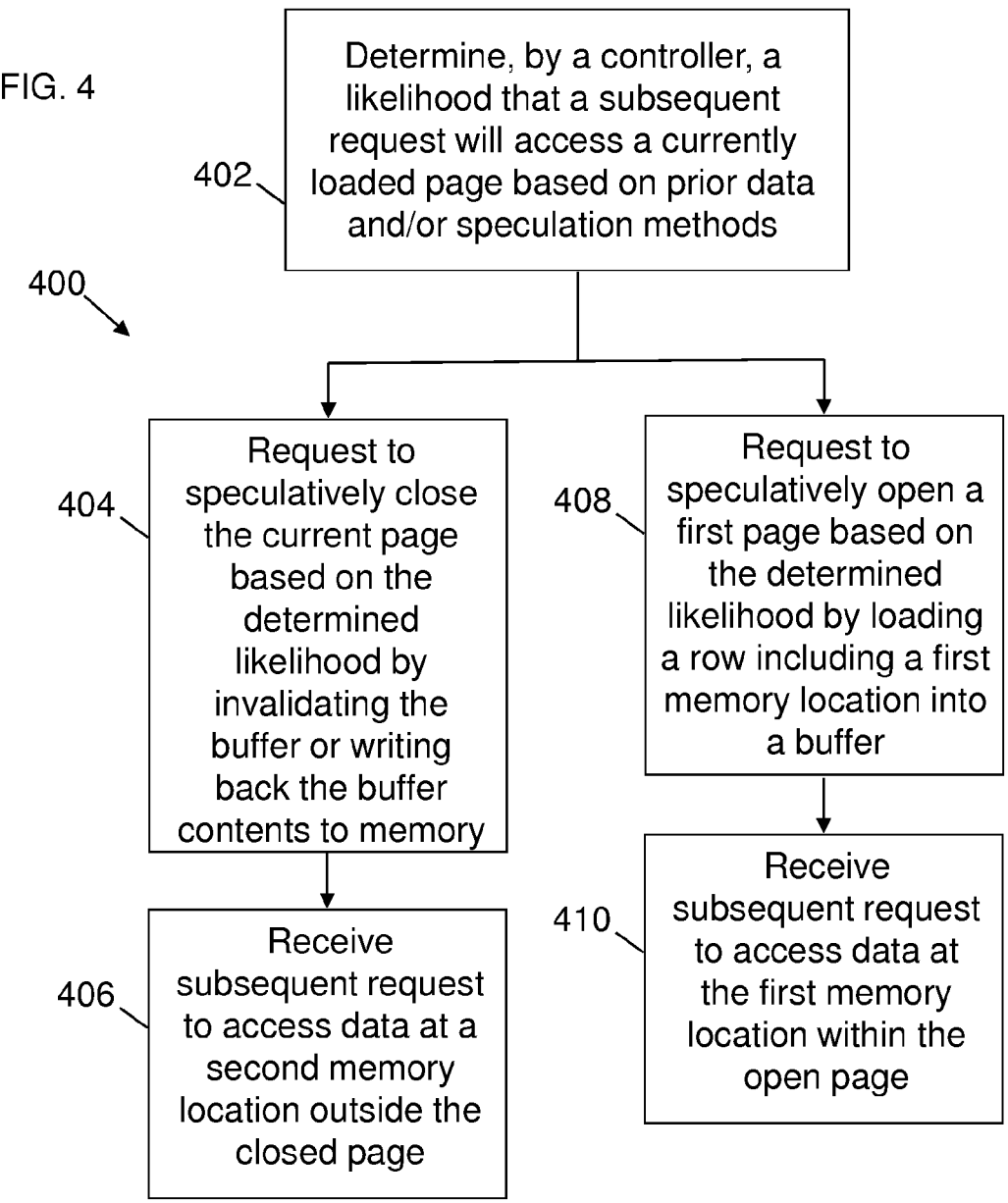
FIG. 4 illustrates a flow diagram of a method for operating a memory system with active buffered memory in accordance with an embodiment.

FIG. 4 is a flow chart 400 of an exemplary method and system for operating a memory system. The blocks may be performed by any suitable memory system, such as a memory system including active buffered memory devices. In block 402, a memory controller determines a likelihood that a subsequent request will access a currently open page or access a memory location outside any currently open page based on prior data accesses and/or other speculation methods discussed above. In block 404, the requestor issues a request to speculatively close or invalidate the currently open page based on the determination in block 402. The closing includes writing back the page contents in the buffer to the memory location. In block 406, a subsequent request is issued by the requestor and received by the receiver to access a memory location in memory outside the page closed in block 404. In block 408, when it is determined the subsequent request will likely access a memory location falling outside any currently open page, the requestor issues a request to speculatively open a page based on the determination in block 402. The page opening includes loading a row including a first memory location into a buffer. In block 410, a request is received to access data at the memory location within the speculatively opened page. Accordingly, the exemplary method illustrated in chart 400 reduces latency and improves performance through dynamic page management.

In an embodiment, a buffer is provided for each bank in a memory device (e.g., 3D memory cube). Accordingly, in an example, latency is reduced using the above processes by opening or closing a page when a subsequent request accesses a memory location in the same bank as a previously loaded page, where the opening or closing is based on a likelihood that a subsequent request will access a currently loaded page or access a memory location outside any currently open page. In another embodiment, a buffer is shared by all banks in a memory device, where the processes above provide reduced latency regardless of whether the bank being accessed by a subsequent request is the same as a currently loaded page.

In an embodiment, the computer system may include a plurality of active buffered memory devices, such as the active buffered memory devices 302, 303 and 304. Further, each active buffered memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by external requestors, like the main processor, coupled to the interconnect network.

Technical effects include improved page management that reduces latency and improves memory performance while reducing power consumed by unnecessary page open/close operations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for operating a memory device, the method comprising:
   receiving a first request from a requestor, wherein the first request includes accessing data at a first memory location in a memory bank;
   opening a first page in the memory bank, wherein opening the first page comprises loading a row including the first memory location into a buffer, the row being loaded from a row location in the memory bank, wherein opening the first page in the memory bank comprises receiving a speculative open request and opening the first page to transition the first page from a closed state to an open state in response to the speculative open request and prior to receiving the first request from the requestor that identifies the first memory location as part of the first request, the speculative open request being based on information relating to a likelihood that the first request will access the first page, the speculative open request comprising an open page request as an only operation of the speculative open request;
   transmitting the data from the first memory location to the requestor;
   determining, by the requestor, a likelihood that a subsequent request will access the first page based on reading an address stride of the first request; and
   determining, by a memory controller, whether to close the first page following execution of the first request based on information relating to the likelihood that the subsequent request will access the first page.

2. The method of claim 1, wherein receiving the first request from the requestor comprises receiving the first request from a processing element or a processor.

3. The method of claim 1, further comprising determining, by the requestor, the likelihood that the subsequent request will access the first page based on at least one selected from the group consisting of: using logic that performs an address lookahead process, using prediction logic based on previous observed behavior, using hints from a compiler or programmer and using stride information from a prefetch mechanism.

4. The method of claim 1, wherein opening the first page in the memory bank comprises loading the row including the first memory location into a sense amplifier buffer in a memory module including the memory bank and wherein closing the first page comprises writing a current version of the row to the row location.

5. The method of claim 1, wherein the memory bank is in a memory stack in the memory device and wherein the memory controller is located in the memory stack.

6. The method of claim 1, further comprising receiving, from the requestor, a speculative close request based on information relating to the likelihood that the subsequent request will access the first page, wherein the speculative close request is received following the first request and before the subsequent request.

7. The method of claim 1, further comprising, writing information to the buffer to update data at the first memory location after opening the first page in the memory bank.

8. The method of claim 1, further comprising, accessing data at the first memory location and using the data for computation local to the memory bank or in an associated memory controller after opening the first page in the memory bank.

9. The method of claim 1, wherein determining, by the memory controller, whether to close the first page following execution of the first request based on information relating to the likelihood that the subsequent request will access the first page comprises determining whether to close the first page based on a selected portion of the first request comprising the information relating to the likelihood that the subsequent request will access the first page.

10. A method for operating a memory device, the method comprising:
    receiving a first request from a requestor, wherein the first request includes accessing data at a first memory location in a memory bank;
    opening a first page in the memory bank, wherein opening the first page comprises loading a row including the first memory location into a buffer, the row being loaded from a row location in the memory bank;
    writing information to the buffer to update the data from the first memory location;
    determining, by the requestor, a likelihood that a subsequent request will access the first page based on reading an address stride of the first request; and
    determining, by a memory controller, whether to close the first page following execution of the first request based on a selected portion of the first request, wherein the selected portion of the first request comprises information relating to the likelihood that the subsequent request will access the first page, the information encoded as a pair of bits defining the likelihood as one of a weak desire to keep the first page open, a strong desire to keep the first page open, a weak desire to close the first page, and a strong desire to close the first page;
    determining a standard policy governed by reliability;
    determining refresh conditions; and
    keeping the first page open or closing the first page based on a combination of the information, the standard policy, and the refresh conditions.

11. The method of claim 10, wherein receiving the first request from the requestor comprises receiving the first request from a processing element or a processor.

12. The method of claim 10, further comprising appending, by the requestor, the selected portion to the first request prior to sending the first request to the memory controller.

13. The method of claim 12, further comprising determining, by the requestor, the likelihood that the subsequent request will access the first page based on at least one selected from the group consisting of: using logic that performs an address lookahead process, using prediction logic based on previous observed behavior, using hints from a compiler or programmer, and using stride information from a prefetch mechanism.

14. The method of claim 10, wherein opening the first page in the memory bank comprises loading the row including the first memory location into a sense amplifier buffer in a memory module including the memory bank.

15. An active buffered memory device comprising:
    a memory bank in a memory vault;
    a memory controller coupled to the memory bank; and
    a processing element coupled to the memory controller and forming a single stack in combination with the memory vault and the memory controller in the active buffered memory device, the active buffered memory device performs a method comprising:
    receiving a first request at the memory controller from the processing element as a requestor, wherein the first request includes accessing data at a first memory location in the memory bank;
    opening a first page in the memory bank, wherein opening the first page comprises loading a row including the first memory location into a buffer, the row being loaded from a row location in the memory bank;

transmitting the data from the first memory location to the requestor;

determining, by the requestor, a likelihood that a subsequent request will access the first page based on reading an address stride of the first request; and determining, by the memory controller, whether to close the first page following execution of the first request based on a selected portion of the first request, wherein the selected portion of the first request comprises information relating to the likelihood that the subsequent request will access the first page;

determining a standard policy governed by reliability;

determining refresh conditions; and keeping the first page open or closing the first page based on a combination of the information, the standard policy, and the refresh conditions.

16. The active buffered memory device of claim 15, wherein the processing element is coupled to an interconnect network that is further coupled by a processor link to a processor.

17. The active buffered memory device of claim 15, wherein closing the first page comprises invalidating the first page or writing a current version of the row to the row location.

18. The active buffered memory device of claim 17, further comprising appending, by the requestor, the selected portion to the first request prior to sending the first request to the memory controller.

19. The active buffered memory device of claim 18, further comprising determining, by the requestor, the likelihood that the subsequent request will access the first page based on at least one selected from the group consisting of: using logic that performs an address lookahead process, using prediction logic based on previous observed behavior, using hints from a compiler or programmer, and using stride information from a prefetch mechanism.

20. The method of claim 9, further comprising appending, by the requestor, the selected portion to the first request prior to sending the first request to the memory controller.

* * * * *